United States Patent [19]

Nelson et al.

[11] Patent Number: 5,574,749
[45] Date of Patent: Nov. 12, 1996

[54] LINE INTERFACE APPARATUS AND METHOD FOR ISOLATING DATA TERMINAL EQUIPMENT FROM THE LINE

[75] Inventors: David P. Nelson; David H. Nabors, both of Huntsville, Ala.

[73] Assignee: Motorola, Inc., Schaumburg, Ill.

[21] Appl. No.: 284,023

[22] Filed: Aug. 1, 1994

[51] Int. Cl.$^6$ .................................................. H04B 1/38
[52] U.S. Cl. ........................ 375/220; 375/258; 379/399; 379/412
[58] Field of Search .................................. 375/219, 220, 375/257, 258, 288; 379/398, 399, 401, 412; 361/119, 107, 108, 111, 117; 455/296–299, 300–312; 370/24.32

[56] References Cited

U.S. PATENT DOCUMENTS 4,536,681  8/1985  Serrano ............................ 179/84 R
4,598,173  7/1986  Chea, Jr. et al. ................. 179/18 FA Primary Examiner—Young T. Tse
Assistant Examiner—Bryan E. Webster
Attorney, Agent, or Firm—J. Ray Wood

[57] ABSTRACT

An improved isolation circuit for protecting data communication equipment from high voltages on a transmission line has two mixers. The first dual balanced mixer (DBMX) translates a data signal on the transmission line to a high frequency and is coupled with an isolation circuit to the second DBMX. The second DBMX then translates the output of the first DBMX to an isolated data signal with the same frequency content as the original data signal.

25 Claims, 2 Drawing Sheets

# LINE INTERFACE APPARATUS AND METHOD FOR ISOLATING DATA TERMINAL EQUIPMENT FROM THE LINE

FIELD OF THE INVENTION

This application relates to data communication devices, including, but not limited to, a line interface apparatus and method for isolating data terminal equipment from the line.

BACKGROUND OF THE INVENTION

Data communication devices (DCDs) are used for data communications between terminals or computers over data lines such as dial-up and dedicated telephone lines. These DCDs include modems, terminal adapters, and digital service equipment. DCDs should be isolated from high voltages that may occur on the data lines. Considering the damage that high voltage can cause the low voltage electronics residing in the DCDs, it is necessary to isolate the low voltage electronics from high voltages. This requirement is set forth in equipment specifications such as Underwriters Laboratory 1459 and Bellcore Technical Reference TR-NWT-001089.

The methods currently used for isolation include transformers and high-voltage capacitors. Both these methods are unsatisfactory. Line isolation based on the use of transformers depends on the enamel coating on the magnet wire windings to provide protection. This enamel coating adversely affects the telecommunications signals due to the leakage inductance associated with wire to wire spacing. The transformers used are relatively large and expensive components of the data communications equipment. Because high-voltage capacitors must provide a low impedance to the data signal, they tend to be physically large.

An improved method of isolating DCDs from the data lines that will also reduce size and cost is desirable.

DESCRIPTION OF THE PREFERRED EMBODIMENT

In order to provide low cost and efficient isolation, a line interface circuit has a first mixer coupled to the line for receiving the data signal and transforming the data signal to a high frequency data signal. A voltage isolation circuit coupled to the first mixer isolates the high frequency data signal, thereby generating an isolated high frequency data signal. A second mixer coupled to the voltage isolation circuit and the data terminal equipment transforms the isolated high frequency data signal to a low frequency isolated data signal. Electrical components using this improved circuitry typically require approximately 5% less of the volumetric space as conventional methods. In addition, both component cost and manufacturing cost are reduced.

Figure 1:
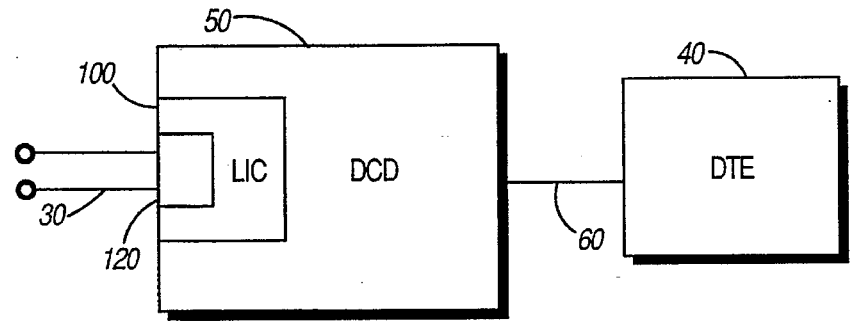
FIG. 1 shows a DCD connected to a transmission line and to a data terminal.

Referring to FIG. 1, a DCD 50 provides an interface between a data terminal equipment (DTE) 40 and the transmission line 30. The DTE 40 may be, but is not limited to personal computers, computer terminals, switched digital devices, and test equipment. The DTE 40 transfers data to/from the DCD via interface 60 which includes, but is not limited to, RS-232, V.35, and RS422 type interfaces. The DCD 50 includes a line interface circuit (LIC) 100 to interface data signals to the line 30 through an impedance matching network 120 (if required) and data processing circuitry to translate data between the LIC 100 and the DTE interface 60. This configuration provides a communications link between the DTE 40 and the transmission line 30.

Figure 2:
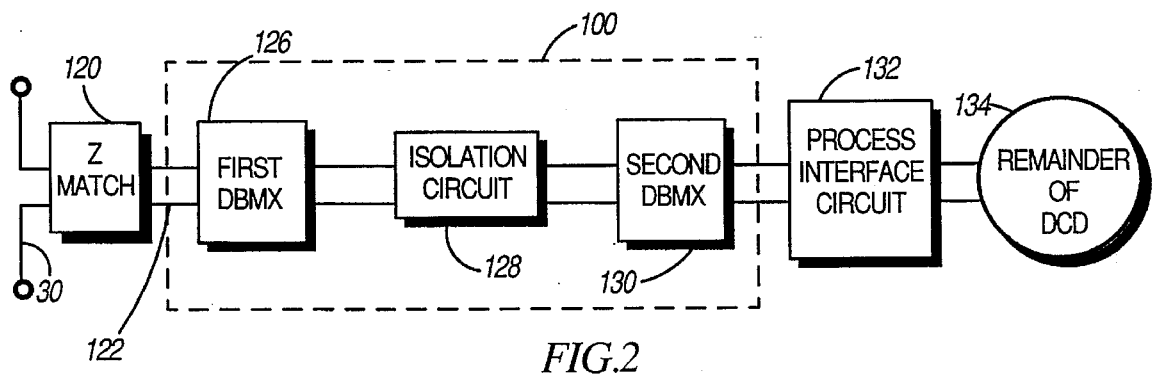
FIG. 2 shows a line interface circuit.

As shown in FIG. 2, the LIC 100 connects to an impedance matching network 120 with connection link 122. The impedance matching network 120 connects directly to the transmission line 30. The LIC 100 comprises a first double-balanced mixer (DBMX) 124 which translates the data signal at connection link 122 to a higher frequency data signal. First DBMX 126 is coupled to Isolation circuit 128 and provides high voltage isolation between first DBMX 126 and second DBMX 130 while presenting a low impedance path for the high frequency data signal, thereby generating an isolated high frequency data signal. Second DBMX 130 translates the isolated high frequency data signal to an isolated low frequency data signal. The output of second DBMX 130 is coupled to processor interface circuit 132. The low frequency data signal has approximately the same information and frequency spectrum as the data signal at connection link 122. The process interface circuit (PIC) 132 provides interface between the LIC 100 and the remainder of the DCD 134. The PIC 132 provides a hybrid type interface where the transmit and receive data signals of the DCD are combined to produce signals suitable for transmission on the transmission line. The PIC 132 includes transmit signal conditioning and a receive equalizer for line loss compensation.

Figure 3:
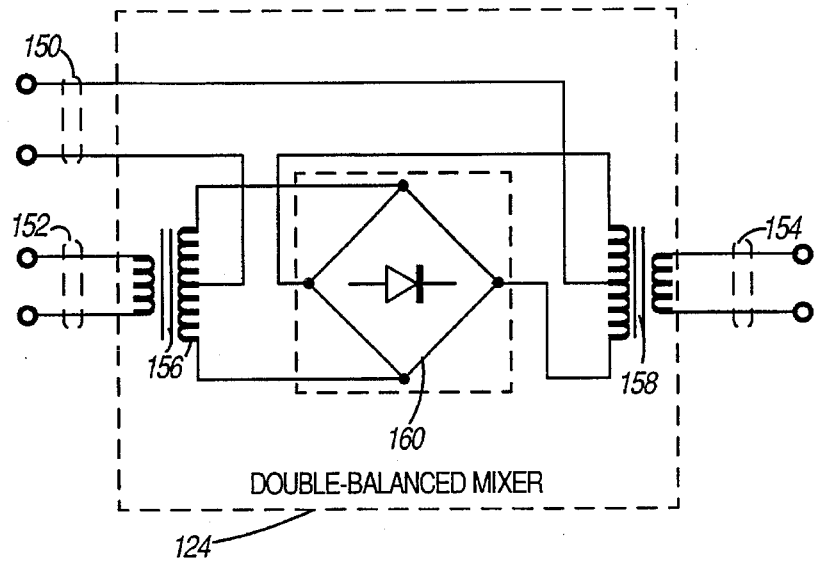
FIG. 3 shows a schematic for a double-balanced mixer.

The schematic for the first DBMX 126 is shown in FIG. 3. First DBMX 126 includes an intermediate frequency (IF) port 150, a local oscillator (LO) port 152, and a radio frequency (RF) port 154. The IF port 150 is connected to the center taps of RF input transformers 156 and output transformer 158. Transformers 156, 158 are connected together via a diode bridge network 160. The LO port 152 connects to input transformer 156 to provide a high frequency signal to modulate the signal present at the IF port 150. RF port 154 connects to output transformer 158. The first DBMX 126 translates the signal at IF port 150 to a high frequency data signal at the RF port 154 by a frequency amount approximately equal to the input signal frequency present at the LO port 152. The first DBMX 126 also translates an input RF signal to a lower frequency signal at the IF port 150 by a frequency amount essentially equal to the input signal frequency present at the LO port 152. The second DBMX 130 is the same configuration as the first DBMX 126 where the RF port connects to isolation circuit 128 and the IF port connects to processor interface circuit 132, as shown in FIG. 2.

Figure 4:
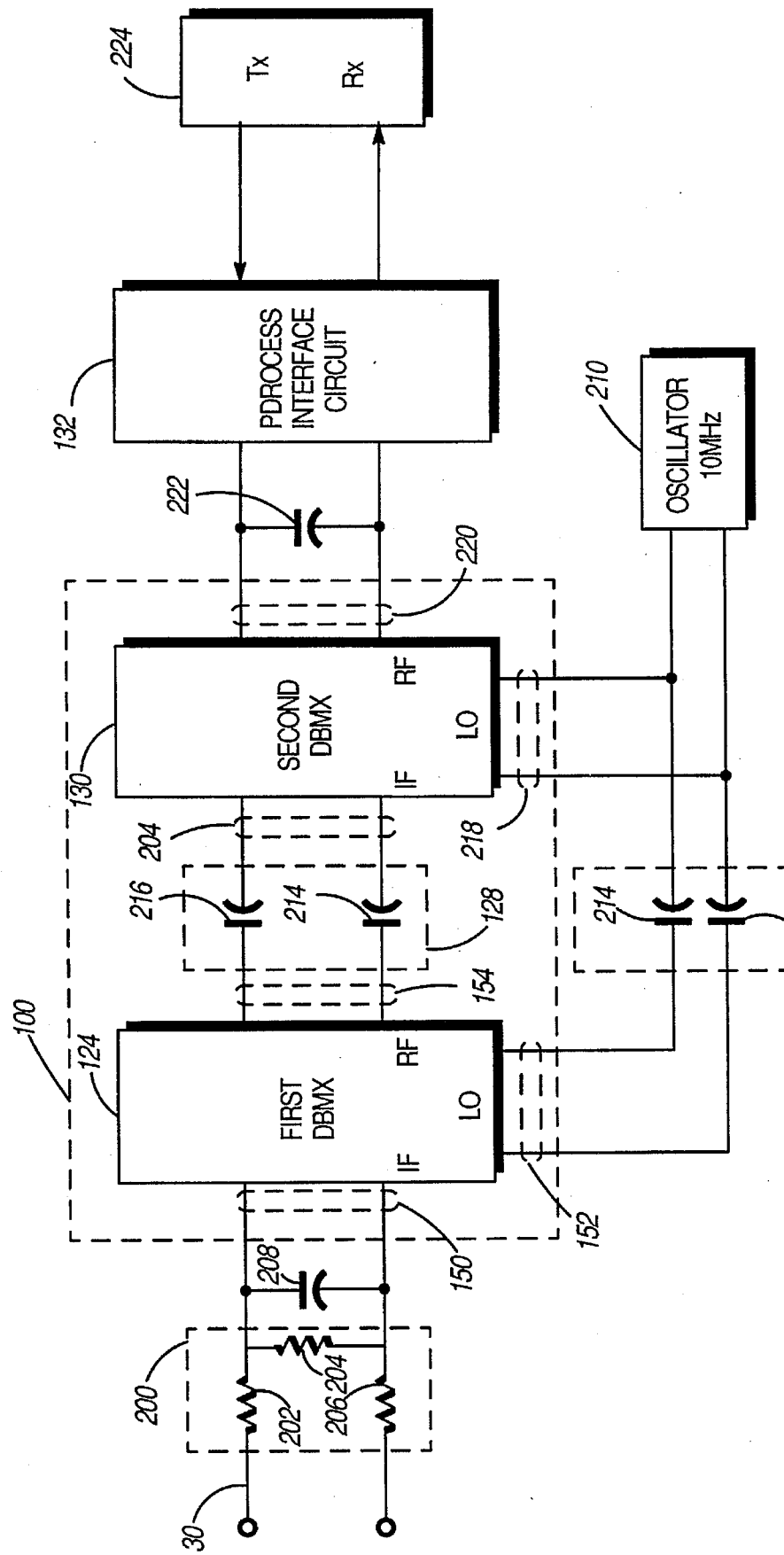
FIG. 4 shows details of a line interface circuit.

The interface circuit is shown in FIG. 4. The transmission line 30 is connected to the IF port 150 of the first DBMX 126 by means of an impedance matching network 200, which includes resistors 202, 204, 206. The impedance matching network 200 is used (if necessary) to match the line characteristic impedance to the input impedance of the first DBMX 126. A typical application would require matching a 135 ohm transmission line impedance to a 50 ohms IF port 150 impedance. In such an application, values for resistors 202, 204 would be 107 ohms and the value for resistor 206 would be 63 ohms. In some applications, the LO port 152 to IF port 150 signal leakage may require a filter capacitor 208 across the IF port 150 to attenuate the LO frequency. A typical value for filter capacitor 208 would be 15 nanofarads (nF) for an LO frequency of 10 megahertz (MHz) and an IF input port impedance of 50 ohms, which would present a low impedance at the LO frequency and a 3 decibel frequency of approximately 200 kilohertz (KHz).

The first DBMX 126 of the LIC 100 is driven at the LO port 152 with a 10 MHz oscillator 210. The oscillator 210 couples through a line isolation network 212 which includes capacitors 214, 216. Line isolation network 212 provides high voltage isolation between the oscillator 210 and the LO port 152 of the first DBMX 126. Typical values for capacitors 214, 216 would be 15 nF with a voltage withstand rating of 2500 VDC (volts direct current) to provide high voltage isolation with a low impedance (1 ohm) signal path at the LO frequency of 10 MHz. The signal at IF port 150 is translated up in frequency by the oscillator frequency at the LO port 152. The resulting high frequency signal is present at the RF port 154. The high frequency signal at the RF port 154 is also translated down in frequency by the frequency present at the IF port 150.

The isolation circuit 128 couples the high frequency signals between the RF port 154 and the second DMBX RF port 204. The isolation circuit 128 includes capacitors 214, 216 and provides high voltage isolation between the RF ports 154, 204 of the two DBMX's 126, 130. Typical values for capacitors 214, 216 would be 15 nF with a voltage withstand rating of 2500 VDC to provide high voltage isolation with a low impedance of approximately 1 ohm to the signal path for the carrier frequency of 10 MHz.

The second DBMX 130 has a high frequency signal present at the second DMBX RF port 204. This signal is translated down in frequency by an amount defined by the second DMBX LO port 218 frequency. The second DMBX LO port 218 is also driven by oscillator 210. Low frequency signals at the second DMBX IF port 220 are also translated up in frequency by the second DMBX LO port 218 frequency and result as high frequency signals at the second DMBX RF port 204. A filter capacitor 222 may be required as a shunt element at the input of PIC 132 to attenuate any leakage signal at the oscillator frequency. A typical value for capacitor 222 would be 15 nF, which presents a low impedance across the IF port 220 at an oscillator frequency of 10 MHz and provides an IF 3 dB bandwidth of approximately 200 KHz for an IF port impedance of 50 ohms.

The PIC 132 in FIG. 4 interfaces the second DBMX IF port 220 to the transmit/receive circuitry 224 of the DCD 50. The PIC 134 includes transmitter conditioning, receiver equalizer, and a hybrid combining network for transmit and receive signal transmission on a single pair line.

By sourcing both DBMX's 124, 130 from a common oscillator 210, the signal from the transmission line connected to the IF port 124 is translated up in frequency, coupled to the second DBMX 106 via the isolation circuit 128, and translated down in frequency to the second DBMX IF port 220 by the same frequency. This process retains the low frequency integrity of the input signal while providing a high voltage isolation barrier between the DBMX's 124, 130. Also, the signal presented at the second DBMX IF port 220 is translated up in frequency, coupled to the first DBMX 124 through isolation circuit 128, and back down in frequency by the same amount in the first DBMX 124. Thus, a low frequency signal is provided for the transmission line at the IF port 150. Low frequency signal integrity is maintained with a high voltage isolation barrier.

We claim:

1. A line interface circuit for coupling data terminal equipment to a line, the data terminal equipment receiving a data signal over the line, comprising:
    (a) a first mixer coupled to the line for receiving the data signal and transforming the data signal to a high frequency data signal (110);
    (b) a voltage isolation circuit coupled to the first mixer for isolating the high frequency data signal, thereby generating an isolated high frequency data signal, the voltage isolation circuit comprising high-voltage capacitors connected between the first mixer and the second mixer; and
    (c) a second mixer coupled to the voltage isolation circuit and the data terminal equipment for transforming the isolated high frequency data signal to a low frequency isolated data signal.

2. The line interface circuit of claim 1, the first mixer being a double-balanced mixer.

3. The line interface circuit of claim 1, the second mixer being a double-balanced mixer.

4. The line interface circuit of claim 1, the low frequency isolated data signal having a frequency spectrum that is almost identical to the frequency spectrum of the data signal.

5. The line interface circuit of claim 1, the first mixer further having a local oscillator input coupling, the local oscillator input coupling having an isolation means for isolation from an oscillator, the first mixer receiving an isolated high frequency signal from the oscillator.

6. The line interface circuit of claim 1, the second mixer further having a local oscillator input coupling, the local oscillator input coupling receiving a high frequency signal from an oscillator.

7. A line interface circuit coupling data terminal equipment with a line, the line having a data signal, comprising:
    (a) a mixer coupled to the line for receiving the data signal, the mixer having a means for transforming the data signal to a high frequency data signal;
    (b) a plurality of high voltage capacitors connected between the mixer and the conversion means; and
    (c) a conversion means for converting the isolated high frequency data signal to an isolated low frequency data signal, the means for converting being coupled to isolation means.

8. A line interface circuit for coupling data terminal equipment to a line, the data terminal equipment receiving a data signal over the line, comprising:
    (a) a first mixer coupled to the line for receiving the data signal and transforming the data signal to a high frequency data signal (110);
    (b) a voltage isolation circuit coupled to the first mixer for isolating the high frequency data signal, thereby generating an isolated high frequency data signal; and,
    (c) a second mixer coupled to the voltage isolation circuit and the data terminal equipment for transforming the isolated high frequency data signal to a low frequency isolated data signal, the low frequency isolated data signal having a frequency spectrum that is almost identical to the frequency spectrum of the data signal.

9. The line interface circuit of claim 8, where the voltage isolation circuit comprises high-voltage capacitors connected between the first mixer and the second mixer.

10. The line interface circuit of claim 8, the first mixer being a double-balanced mixer.

11. The line interface circuit of claim 8, the second mixer being a double-balanced mixer.

12. The line interface circuit of claim 8, the first mixer further having a local oscillator input coupling, the local oscillator input coupling having an isolation means for isolation from an oscillator, the first mixer receiving an isolated high frequency signal from the oscillator.

13. The line interface circuit of claim 8, the second mixer further having a local oscillator input coupling, the local oscillator input coupling receiving a high frequency signal from an oscillator.

14. A line interface circuit for coupling data terminal equipment to a line, the data terminal equipment receiving a data signal over the line, comprising:
  (a) a first mixer coupled to the line for receiving the data signal and transforming the data signal to a high frequency data signal;
  (b) the first mixer having a local oscillator input coupling, the local oscillator input coupling having an isolation means for isolation from an oscillator, the first mixer receiving an isolated high frequency signal from the oscillator;
  (c) a voltage isolation circuit coupled to the first mixer for isolating the high frequency data signal, thereby generating an isolated high frequency data signal; and
  (d) a second mixer coupled to the voltage isolation circuit and the data terminal equipment for transforming the isolated high frequency data signal to a low frequency isolated data signal.

15. The line interface circuit of claim 14, where the voltage isolation circuit comprises high-voltage capacitors connected between the first mixer and the second mixer.

16. The line interface circuit of claim 14, the first mixer being a double-balanced mixer.

17. The line interface circuit of claim 14, the second mixer being a double-balanced mixer.

18. The line interface circuit of claim 14, the low frequency isolated data signal having a frequency spectrum that is almost identical to the frequency spectrum of the data signal.

19. The line interface circuit of claim 14; the second mixer further having a local oscillator input coupling, the local oscillator input coupling receiving a high frequency signal from an oscillator.

20. A line interface circuit for coupling data terminal equipment to a line, the data terminal equipment receiving a data signal over the line, comprising:
  (a) a first mixer coupled to the line for receiving the data signal and transforming the data signal to a high frequency data signal;
  (b) a voltage isolation circuit coupled to the first mixer for isolating the high frequency data signal, thereby generating an isolated high frequency data signal; and
  (c) a second mixer coupled to the voltage isolation circuit and the data terminal equipment for transforming the isolated high frequency data signal to a low frequency isolated data signal, the second mixer having a local oscillator input coupling, the local oscillator input coupling receiving a high frequency signal from an oscillator.

21. The line interface circuit of claim 1, where the voltage isolation circuit comprises high-voltage capacitors connected between the first mixer and the second mixer.

22. The line interface circuit of claim 1, the first mixer being a double-balanced mixer.

23. The line interface circuit of claim 1, the second mixer being a double-balanced mixer.

24. The line interface circuit of claim 1, the low frequency isolated data signal having a frequency spectrum that is almost identical to the frequency spectrum of the data signal.

25. The line interface circuit of claim 1, the first mixer further having a local oscillator input coupling, the local oscillator input coupling having an isolation means for isolation from an oscillator (208), the first mixer receiving an isolated high frequency signal from the oscillator.

* * * * *